Figure 1:
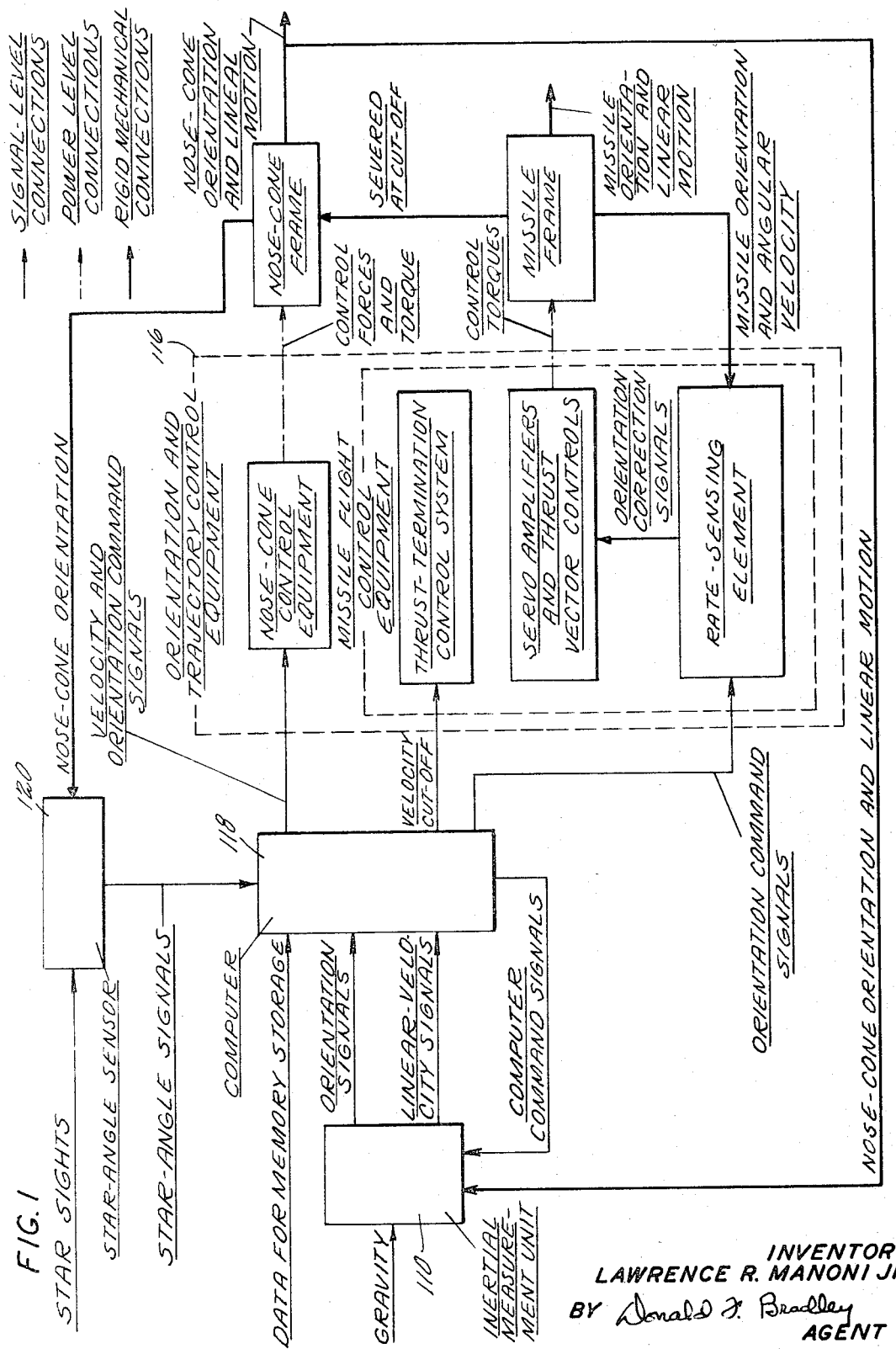

INVENTOR
LAWRENCE R. MANONI JR.
BY Donald F. Bradley
AGENT

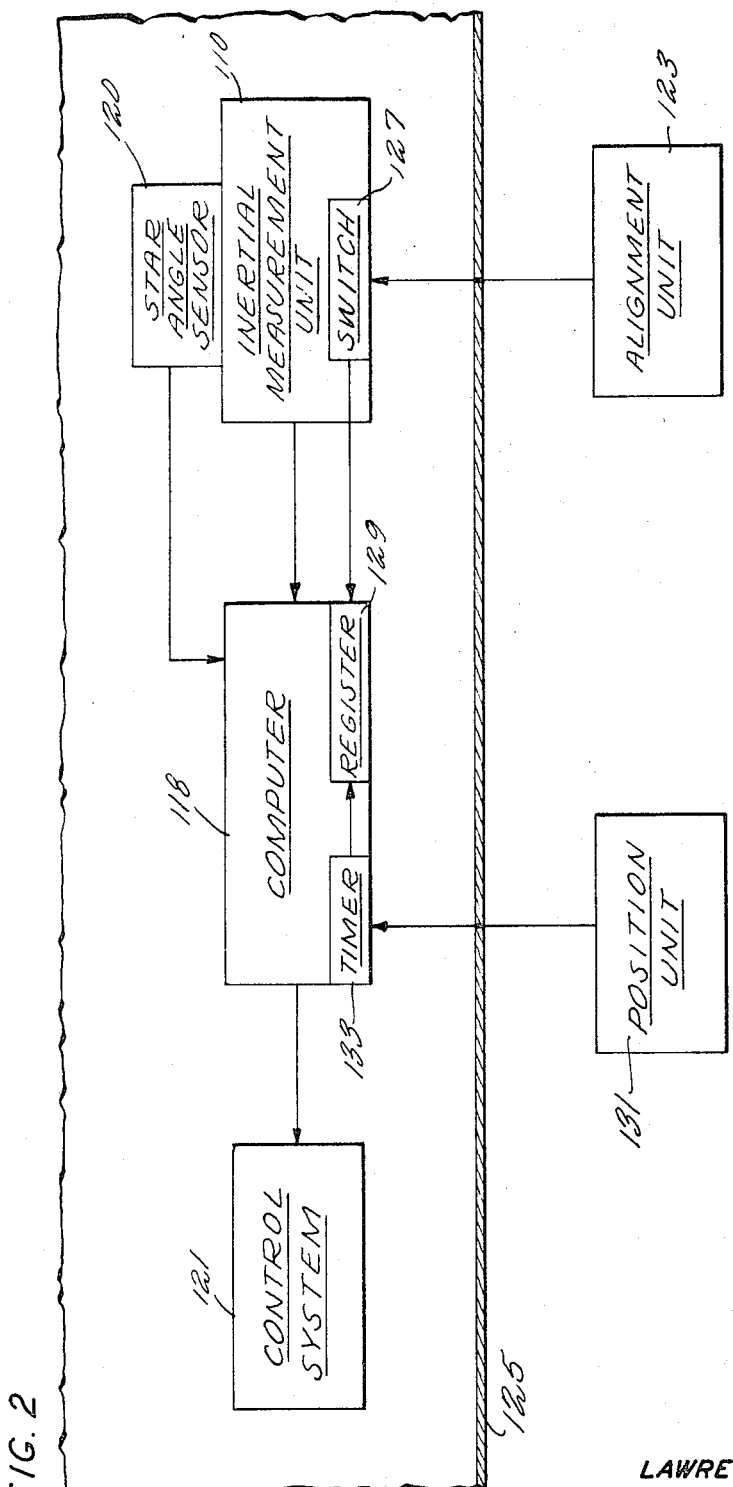

United States Patent Office 3,342,982
Patented Sept. 19, 1967

3,342,982
SPACE VEHICLE NAVIGATION SYSTEM FOR OBTAINING EITHER GYRO DRIFT, LAUNCH POSITION, OR COORDINATE SYSTEM ORIENTATION
Lawrence R. Manoni, Jr., Wethersfield, Conn., assignor to United Aircraft Corporation, East Hartford, Conn., a corporation of Delaware
Filed Sept. 25, 1961, Ser. No. 140,518
4 Claims. (Cl. 235—150.25)

This invention relates to guidance systems for ballistic missiles or other maneuverable space vehicles, and particularly to the automatic utilization of information external to the guidance system to provide extreme accuracy. A novel method is provided for automatically varying the mode of operation of the guidance system as external information is altered or degraded.

The desirability of having highly mobile ballistic missiles as part of our nation's weapon arsenal is well established. The primary advantage of such mobile weapons lies in their being relatively invulnerable to enemy attack. However, with mobility usually comes a decrease in the precision with which the launching position and alignment can be established. A guidance system which overcomes these disadvantages and provides a ballistic-missile system which is capable of mobile operation and at the same time has its accuracy unimpaired by lack of precise knowledge of launching position and alignment is disclosed and claimed in copending application Ser. No. 115,867, filed June 7, 1961, now Patent No. 3,301,508 and assigned to the same assignee as the present invention.

The ability of the missile to tolerate positional and orientation uncertainty at launch without degradation of accuracy is achieved through system design features that result in what is termed a "launch-in-ignorance" capability. This capability means that just as long as the launching position is known to be within a broad area of several hundred square miles that is centered on the actual launching position, and the orientation of the coordinate system is known approximately, an accurate launch position can be established by the system itself during flight by use of data obtained from two appropriate star sights.

In addition, the missile is capable of being launched immediately after enemy attack, which may cause maladjustments of the inertial measurement unit, from a fixed base where launch position is known, without any requirement for the use of external equipment for determining the rotation or alignment of the coordinate system used in the mission and thus realigning and reestablishing the azimuth and vertical. With the known launch position and two star sights the guidance system will, during flight of the missile, compute the actual launch vertical and azimuth.

Where initial conditions including launch position, vertical and azimuth are accurately known at the time of launch, gyro drift and accelerometer bias may be calibrated in flight by use of the data obtained from appropriate star sights made during flight. The procedure for utilizing the guidance system for measuring gyro and accelerometer errors is described in detail and claimed in copending U.S. application Ser. No. 135,358, entitled, "Space Vehicle Guidance System," filed Aug. 31, 1961, now Patent No. 3,310,982 and assigned to the same assignee.

It is obvious that of the three modes of operation described above, namely, initial position determination, vertical and azimuth alignment, and gyro drift and accelerometer correction, the last-mentioned mode will result in the greatest accuracy since all initial conditions are accurately known at launch, and this is the preferred mode of operation. However, as knowledge of the initial conditions becomes less certain, a point will be reached where the guidance system will be able to compute the initial conditions by means of star sights with a greater accuracy than if the system relied on the uncertain initial conditions. For example, a mobile ballistic missile may contain an inertial measurement unit operated in an undamped Schuler-tuned gyro-compassing mode to keep track of present position prior to launch. Since the position-tracking information produced by such systems degrades with time in a predictable known manner, it is apparent that, unless the present position data is updated at intervals, cumulative errors inherent in the Schuler-tuning will result in an erroneous present position indication. This invention will allow the guidance system to automatically switch from the mode of operation in which gyro drift and acceleration are computed from the data gathered by the star sights to the mode of operation in which launch position is computed from the data gathered by the star sights when the present position indication has degraded beyond a predetermined accuracy.

Further, the missile itself may be placed on a fixed launch site, as for example in a pit. In this case the guidance system will know all initial conditions at launch, and the star sight data will be used to correct gyro bias. However, if an enemy attack results in maladjustments in the inertial measurement unit and the alignment of the coordinate axes, the missile could still be fired instantaneously because, with this invention, the guidance system would sense the loss of reference coordinates and automatically switch into the mode of operation which would utilize the star sight data to compute the initial vertical and azimuth alignment.

It is therefore an object of this invention to provide a novel guidance system for maneuverable space bodies in which the system is automatically switched from one mode of operation to another as external information is altered or degraded.

Another object of this invention is a novel missile guidance system which will automatically select the most accurate mode of operation of the system.

A further object of this invention is a novel missile guidance system in which data produced by star sights taken during flight is utilized to compute gyro drift, coordinate alignment, or initial position, the mode of operation being automatically determined by the guidance system.

These and other objects and a fuller understanding of the invention may be had by referring to the following description and claims taken in conjunction with the following drawings in which:

FIG. 1 is a complete functional block diagram of the guidance and control system; and FIG. 2 is a functional block diagram of the automatic mode selection equipment.

FIG. 1 shows that the orientation and linear motion of the missile during powered flight, and the orientation and linear motion of the nosecone following separation, are directly controlled by the orientation and trajectory control equipment 116. This equipment controls the application of forces and torques on the missile frame during the powered flight phase, and of forces and torques on the nosecone frame during the subsequent phases, all in accordance with velocity and orientation command signals that come from the missile computer 118. All of the control equipment required for the powered flight phase is preferably located in the nosecone.

In order to generate these command signals, computer 118 relies upon information stored within its memory unit and utilizes also, at various times during the course of the trajectory, the information provided in the signals from the inertial measurement unit 110 and the star-angle sensor 120.

The input signals from the inertial measurement unit 110 comprise a set that continuously and completely specify any rotation of the nosecone from an inertial reference orientation and a set that continuously and completely specifies the instantaneous linear velocity or acceleration of the nosecone with respect to inertial space. For practical purposes in ballistic-missile applications, inertial space is space with respect to which the Earth makes a complete 360° revolution once every sidereal day. The input signals from the star-angle sensor 120 comprise a set that instantaneously and completely specifies the angular offset between the actual line of sight between the nosecone and a selected star and the direction in which the star-angle sensor 120 was pointed toward the star for the purpose of making a particular star sight. The angular offset, called the star angle, is specified both in magnitude and direction by the signals from the star-angle sensor 120.

All three sets of input signals to the computer 118 may be analog-type signals. Inside the computer 118, which may be a general-purpose digital computer, these signals may be converted to digital signals. These digital signals are then appropriately programmed through the computer in accordance with preset routines to obtain the information required during the various phases of the ballistic-missile mission.

The inertial measurement unit 110 provides output signals proportional to changes in orientation of the nosecone with respect to inertial space. The orientation is measured by sensors on the gimbals of the unit. Three gyroscopes are used to form the inner cluster as an inertial reference.

The inertial measurement unit 110 provides output signals proportional to the instantaneous linear velocity of the nosecone through the integrating action of three accelerometer units that are also mounted on the space-stabilized platform and by virtue of the rigid coupling between the inertial measurement unit 110 and the nosecone; non-integrating accelerometers may also be used. This rigid coupling means that any changes in linear velocity of the nosecone with respect to inertial space are instantaneously and accurately sensed by the accelerometer units, integrated, and linear-velocity output signals generated therefrom by the inertial measurement unit 110.

The star-angle sensor 120 provides output signals by virtue of its rigid mounting to the nosecone frame and its ability to accurately and rapidly determine the difference between the direction in which its optical system has been directed by nosecone reorientation for star sighting and the actual line of sight between the nosecone and a selected star. The star-angle sensor 120 rotates with the nosecone as it changes orientation, thereby effectively receiving nosecone orientation as a continuous input. The star-sight inputs themselves comprise two sights for use in determining the accurate position of the launch point that requires but a short portion of the time required for the entire missile trajectory. A complete description of the guidance and control system may be had by referring to copending application Ser. No. 115,867, which relates specifically to the initial position determination and to the vertical and azimuth alignment modes of operation, and to copending application Ser. No. 135,358, which relates specifically to the gyro drift and accelerometer correction. The teachings of the above copending applications are hereby incorporated into the present application.

FIG. 2 shows specifically the components required to automatically vary the mode of operation of the missile. The inertial measurement unit 110 is connected with computer 118, and orientation and velocity signals are transmitted from the inertial measurement unit to the computer through the link. The star-angle sensor 120 is shown physically attached to inertial measurement unit 110, and the data from the star-sensor 120 is also fed to computer 118. The computer 118 utilizes the orientation and velocity information from inertial measurement unit 110 and the data from star-sensor 120 and generates commands to control system 121. Control system 121 includes all flight control equipment in the nosecone and the missile itself and is equivalent to the orientation and trajectory control equipment 116 of FIG. 1.

Block 123, labeled alignment unit, is connected with inertial measurement unit 110. The alignment unit 123 is situated outside the missile itself and does not form a part of the guidance system. The signals generated by the alignment unit 123 may be optical or electrical signals and are transmitted through missile wall 125 by any known means. For example, consider that the missile is situated in a pit ready for firing.

An alignment unit comprising mirrors and autocollimators may be set up adjacent the missile, and a light sensitive switch 127 connected with the inertial measurement unit 110. When the light from the autocollimator and mirror system of alignment unit 123 is sensed by switch 127, the inertial measurement unit 110 is aligned properly. Switch 127 can provide a signal to computer 118 indicative of the fact that the missile guidance system may rely on the orientation data generated by the inertial measurement unit. This may be done by a binary representation, e.g., switch 127 will generate a signal when the switch is actuated by the light from the autocollimator, while no signal is present when the switch 127 does not see the light beam. The signal or absence of a signal may be stored in a register 129 within computer 118. The computer program may then test the storage register 129 and determine at any instant whether the guidance system may reliably use the alignment information received from the components of the inertial measurement unit 110, or whether the start-sight data must be used to compute the alignment. Thus, at the instant of blast off the guidance system, by testing the storage register 129, will be able to determine automatically the proper mode of operation to produce the most accurate mission.

Typical operation of the guidance system requires the coding of the following procedures in the flight computer 118: (1) vertical measurement prior to launch; (2) position tracking loop; (3) guidance and steering equations; (4) attitude control system and star-angle sensor control; (5) data reduction to calculate misalignment of the coordinate axes; (6a) gyro drift and accelerometer correction; (6b) vertical and azimuth alignment; (6c) initial position determination; (7) trajectory recalculation and vernier calculation; and (8) trajectory correction, 3rd star sight, and reentry steering.

With the missile fixed and the alignment unit 123 in use, the sequence above with procedures 6b and 6c omitted would provide guidance to the target including instrument calibration and compensation. If the alignment unit 123 is disturbed or knocked out of the field of view of light switch 127 by a blast, switch 127 would alter register 129 in flight computer 118 to change the program to eliminate procedures 6a and 6c. The details of the operations necessary to change the computer program are well known and need not be described.

If the missile is mobile, position information may be obtained by operating the components of the inertial measurement unit 110 in an undamped, Schuler-tuned gyrocompassing mode, updating the position indication at intervals by means of external position data fed into the computer 118. The accuracy of the position data is known to degrade with time in a predictable manner, and depending on the rate of degradation of the position data and the accuracy of the initial position determination utilizing the star sights, a point in time will be reached where the missile will be able to locate its initial position itself from the star sights with greater accuracy than if the guidance system depended upon the stored position information. The external position unit shown in FIG. 2 as block 131 may be any type of data transfer link which will transmit to proper storage registers of computer 118 the latest position data. A timer 133 is shown connected with computer 118. If timer 133 is activated at the time when the latest accurate data is fed into the computer, the timer may be set to indicate to the program that the data in the computer storage is accurate and may be used.

This may be done by setting a register similar to that shown by reference numeral 129. After passage of a predetermined time, timer 133 will switch the register to indicate that, because of degradation of the position information with time during mobile operation, the guidance system program should ignore the stored position data and use the star-sight data to compute position. This may be accomplished as before by having the program test the register and instructing the program to eliminate procedures 6a and 6b.

Preferably the light sensitive switch 127 and the timer 133 will be resettable, that is, when a new position fix is inserted into memory the timer 133 is reset, or if the autocollimator is realigned, the light sensitive switch 127 is reset and the guidance system is returned to its initial operational mode, utilizing only procedure 6a.

Other arrangements may obviously be used to provide the guidance system with information of position and alignment. For example, the timer 133 may be connected to sense both the passage of time and the movement of the missile so that the timer will be operative only during movement of the missile. Thus, if the missile is not moved after accurate position data is inserted from position unit 131, timer 133 will not run and the register will indicate that the guidance system should use the position data in the computer regardless of the actual real time which has passed. Alternatively, the position data may be continuously inserted while the missile is stationary.

It is also obvious that the alignment need not be an autocollimator or optical system, but that any arrangement which will sense and indicate the alignment of the inertial measurement unit may be used.

Likewise, the position data input may take the form of a tape, transmitter or any other arrangement which will transmit the position data to the computer. The teachings of this invention are not limited to the particular guidance system shown, but may be applied to any other system. Many changes and modifications may be made to the combination and arrangement of parts without departing from the scope of the invention.

I claim:

1. In a space vehicle navigation system having an inertial sensor including a plurality of gyros for determining vehicle orientation in a coordinate system, a stellar sensor, and data storage means, said system having the capability of accurately determining either gyro drift, vehicle launch position or vehicle coordinate system orientation utilizing data procured by means of star sights taken during flight by said stellar sensor, the improvement comprising means for generating signals indicative of vehicle present position and feeding said position signals to said data storage means at random intervals prior to flight, means for generating signals indicative of vehicle coordinate system orientation and feeding said orientation signals to said data storage means at random intervals prior to flight, first and second switch means connected with said data storage means, each of said switch means having first and second states, means for switching said first switch means to said first state when said position signals are fed to said data storage means, means for switching said second switch means to said first state when said orientation signals are fed to said data storage means, means for switching said first switch means to said second state when said vehicle position has changed by a predetermined amount from the last position signals fed to said data storage means, means for switching said second switch means to said second state when said vehicle orientation has changed by a predetermined amount from the last orientation signals fed to said data storage means, means for determining the state of both said switch means during flight of said vehicle, means for producing data from star sights made during flight by said stellar sensor, means for utilizing said data to determine gyro drift when both said switch means are in their first state, and means for utilizing said data to determine vehicle launch position or vehicle coordinate system orientation when either said first or second switch means respectively are in said second state.

2. A space vehicle navigation system as in claim 1 in which said means for switching said first switch means to said second state comprises a timer which switches said first switch means from said first state to said second state at a predetermined time after position signals are fed to said data storage means.

3. A space vehicle navigation system as in claim 2 in which said timer is operative only during movement of said vehicle prior to launch.

4. A space vehicle navigation system as in claim 1 in which said means for switching said second switch means to said second state comprises optical means situated adjacent said vehicle for generating a light beam, optical receiving means connected with said vehicle inertial sensor and adapted to receive said beam, and means for switching said second switch means from said first state to said second state when said light beam is not focused upon said receiving means.

References Cited

UNITED STATES PATENTS

| | | | |
|---|---|---|---|
| 2,995,318 | 8/1961 | Cocharo | 244—14 |
| 3,020,868 | 2/1962 | Dickieson | 244—14 |
| 3,031,658 | 4/1962 | Green et al. | 235—187 |

OTHER REFERENCES

Carroll, "Interplanetary Navigation by Optical Resection and Inertial Systems," Aero/Space Eng., vol. 18, No. 3, March 1959, pp. 53–55 and 75.

Nichinson, "An Automatic Astro Compass," Navigation, vol. 6, No. 3, Autumn 1958, pp. 182–189.

RODNEY D. BENNETT, *Primary Examiner.*

CHESTER L. JUSTUS, SAMUEL FEINBERG, BENJAMIN A. BORCHELT, *Examiners.*

A. E. HALL, T. A. ROBINSON, N. F. HUBLER,
*Assistant Examiners.*